United States Patent [19]

Burtelson

[11] Patent Number: 5,448,018

[45] Date of Patent: Sep. 5, 1995

[54] WIREHOLDER AND INSTALLING TOOL THEREFOR

[75] Inventor: Frederick W. Burtelson, Harvard, Ill.

[73] Assignee: Joslyn Manufacturing Company, Chicago, Ill.

[21] Appl. No.: 102,590

[22] Filed: Aug. 5, 1993

[51] Int. Cl.⁶ .............................. H01B 17/16
[52] U.S. Cl. ....................... 174/158 R; 81/176.15; 81/461; 174/158 R; 174/161 F; 174/165; 174/166 S; 174/167
[58] Field of Search .......... 174/158 R, 158 F, 161 F, 174/164, 165, 166 R, 166 S, 167, 168, 157, 159; 248/71, 65; 81/176.1, 176.15, 461

[56] References Cited

U.S. PATENT DOCUMENTS

| | | | |
|---|---|---|---|
| Re. 22,469 | 4/1944 | Lemont | 174/164 X |
| 930,751 | 8/1909 | Graham | |
| 1,864,300 | 6/1932 | Forrest | |
| 2,139,333 | 12/1938 | Pittman et al. | |
| 2,295,872 | 9/1942 | Stohl | |
| 2,961,518 | 11/1960 | Hermann | |
| 3,935,378 | 1/1976 | Heyden | 174/158 R |
| 4,267,402 | 5/1981 | Reighter | 174/137 R |
| 4,325,405 | 4/1982 | Christo | 137/371 |
| 4,818,319 | 4/1989 | Beer et al. | 156/192 |
| 4,823,650 | 4/1989 | Tuttle | 81/176.15 X |
| 4,883,588 | 11/1989 | Primavera et al. | 81/176.15 X |
| 5,119,544 | 6/1992 | Jackson | 29/240 |

FOREIGN PATENT DOCUMENTS 608095 11/1960 Canada .................. 81/461

OTHER PUBLICATIONS

1991 Joslyn Manufacturing Co. product catalog, pp. PH-108 and PH-109.

*Primary Examiner*—Morris H. Nimmo
*Attorney, Agent, or Firm*—Marshall, O'Toole, Gerstein, Murray & Borun

[57] ABSTRACT

A wireholder includes a main body portion, an attaching portion, and a tool receiving portion. The main body portion is arranged to receive a wire to be secured to a structure. The attaching portion is affixed to the main body portion and has a configuration to facilitate the attachment of the main body portion to the structure. The tool receiving portion is arranged to receive an installing tool. The main body portion has a strength so that torque can be transferred from a power tool to the attaching portion through the installing tool and the main body portion. The installing tool is arranged to break if excessive torque is applied to the wireholder by the installing tool.

46 Claims, 6 Drawing Sheets

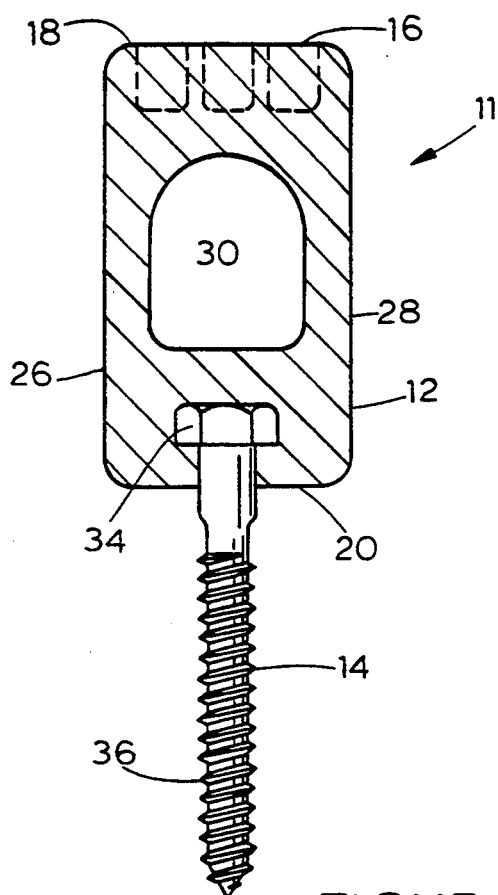
FIGURE 4
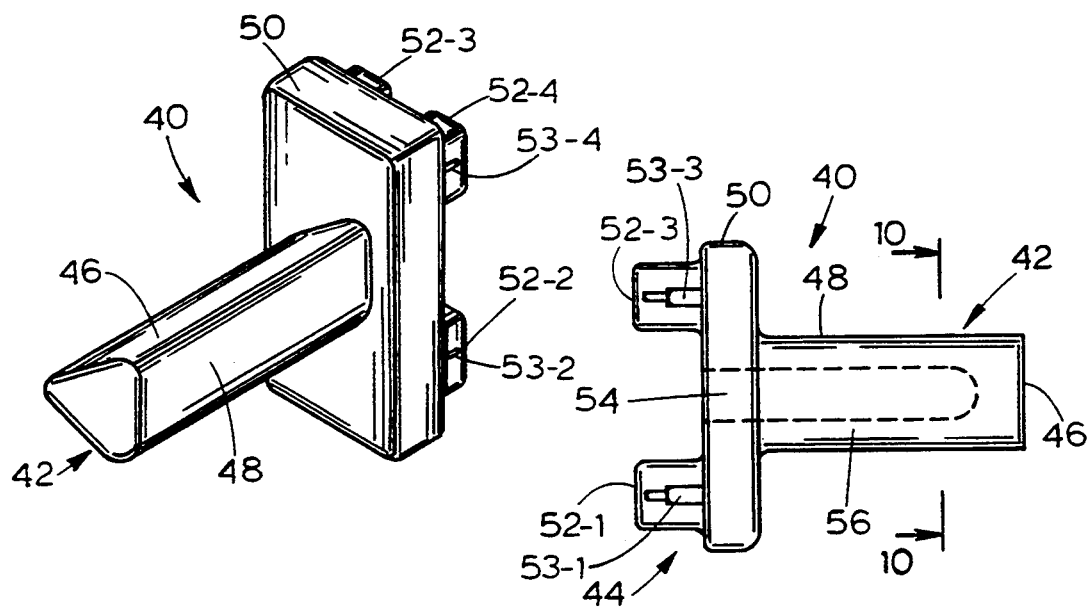
FIGURE 5
FIGURE 6 ized ground conductor are run from the overhead electrical power utility pole to the electrical meter of the building. However, before these conductors are connected to the electrical meter, they are anchored to the building in order to minimize stress on the connection point at which the conductors are connected to the electrical meter.

WIREHOLDER AND INSTALLING TOOL THEREFOR

FIELD OF THE INVENTION

The present invention relates to a wireholder and to an installing tool for facilitating the attachment of the wireholder to a structure.

BACKGROUND OF THE INVENTION

Wireholders are often used to secure wires to a structure. For example, when a building having an electrical meter is to be provided with electrical service from an overhead electrical power utility pole, one or more insulated high voltage conductors and a usually uninsulated ground conductor are run from the overhead electrical power utility pole to the electrical meter of the building. However, before these conductors are connected to the electrical meter, they are anchored to the building in order to minimize stress on the connection point at which the conductors are connected to the electrical meter.

In order to provide an anchor for the conductors, a wireholder is attached to the building, usually near its roof. The high voltage conductors are twisted around the ground conductor (which is sometimes referred to as a messenger), and a wedge clamp, having a loop of wire, is clamped to the ground conductor. The loop of wire of the wedge clamp has two ends. One of these ends is released from the wedge clamp, is threaded through the wireholder attached to the side of the building, and is reattached to the wedge clamp with enough tension that the wireholder isolates the connection point of the conductors and the electrical meter from most stress.

One example of a wireholder is shown in U.S. Pat. No. 2,295,872. This wireholder, as is typical of wireholders in the prior art, comprises a porcelain body affixed to an attachment device such as a wood screw. The porcelain body has a hole therethrough for receiving a wire to be held by the wireholder.

There are several problems with this type of wireholder. For example, since porcelain is brittle, rough handling during shipment of a porcelain wireholder often results in chipping and/or breakage of the wireholder's porcelain. Furthermore, since the porcelain of a wireholder can also chip and break during installation of a wireholder, the selection of porcelain for a wireholder virtually precludes the use of power tools to install a porcelain wireholder.

SUMMARY OF THE INVENTION

The present invention substantially avoids these problems. According to the present invention, a wireholder is constructed of a material which is stronger than porcelain. Therefore, the wireholder is much less likely to chip and/or break during its shipment. Also, the wireholder of the present invention is configured so that a power tool (or similar device) may be used to install the wireholder. An installing tool is provided to facilitate the use of the power tool in order to attach the wireholder to a structure. The installing tool, according to the present invention, is itself configured to minimize the chance of damaging the wireholder during installation of the wireholder.

Therefore, according to one aspect of the present invention, a wireholder includes a wire receiving means, an attaching means, and a tool receiving means. The wire receiving means is arranged to receive a wire to be secured to a structure. The attaching means is arranged to attach the wire receiving means to the structure. The tool receiving means is arranged to receive an installing tool so that the installing tool can attach the wire receiving means to the structure by way of the attaching means.

According to a further aspect of the present invention, a wireholder comprises a main body portion and an attaching portion. The main body portion is arranged to receive and to hold a wire to be secured to a structure. The attaching portion is affixed to the main body portion and has a configuration for facilitating the attachment of the main body portion to the structure. The main body portion has a strength, and is configured to receive an installing tool, so that torque can be transferred from a power tool to the attaching portion through the installing tool and the main body portion.

According to a still further aspect of the present invention, an installing tool for use in installing a wireholder includes first and second ends. The first end is arranged to releasably engage the wireholder. The second end is arranged to releasably engage the first end to a power tool so that, when the first end engages a wireholder and the second end engages the power tool, torque may be transferred from the power tool to the wireholder by way of the first end.

According to another aspect of the present invention, a wire holding arrangement includes an installing tool and a wireholder. The installing tool has a stem which is arranged to fit into a chuck of a power drill. The installing tool further has a torque transferring device driven by the stem. The wireholder includes a main body portion being arranged to receive a wire to be secured to a structure and to releasably receive the torque transferring device of the installing tool. The wireholder also has an attaching portion affixed to the main body portion wherein the attaching portion has a configuration for facilitating the attachment of the main body portion to the structure. The main body portion of the wireholder has a strength to permit torque from the power drill to be transferred from the power drill to the attaching portion through the installing tool and the main body portion.

According to still another aspect of the invention, a method of installing a wireholder comprises the steps of (i) attaching a stem of an installing tool to a power tool, (ii) attaching the installing tool to a wireholder, and (iii) energizing the power tool to transfer torque from the power tool to the wireholder through the installing tool in order to attach the wireholder to a structure.

BRIEF DESCRIPTION OF THE DRAWING

These and other features and advantages of the invention will become more apparent from a detailed consideration of the invention when taken in conjunction with the drawing in which:

FIG. 4 is a partial cross-sectional side view of the wireholder shown in FIG. 1;

FIG. 5 is a perspective view of an installing tool according to the present invention;

FIG. 6 is a top view of the installing tool shown in FIG. 5;

DETAILED DESCRIPTION OF THE INVENTION

Figure 1:
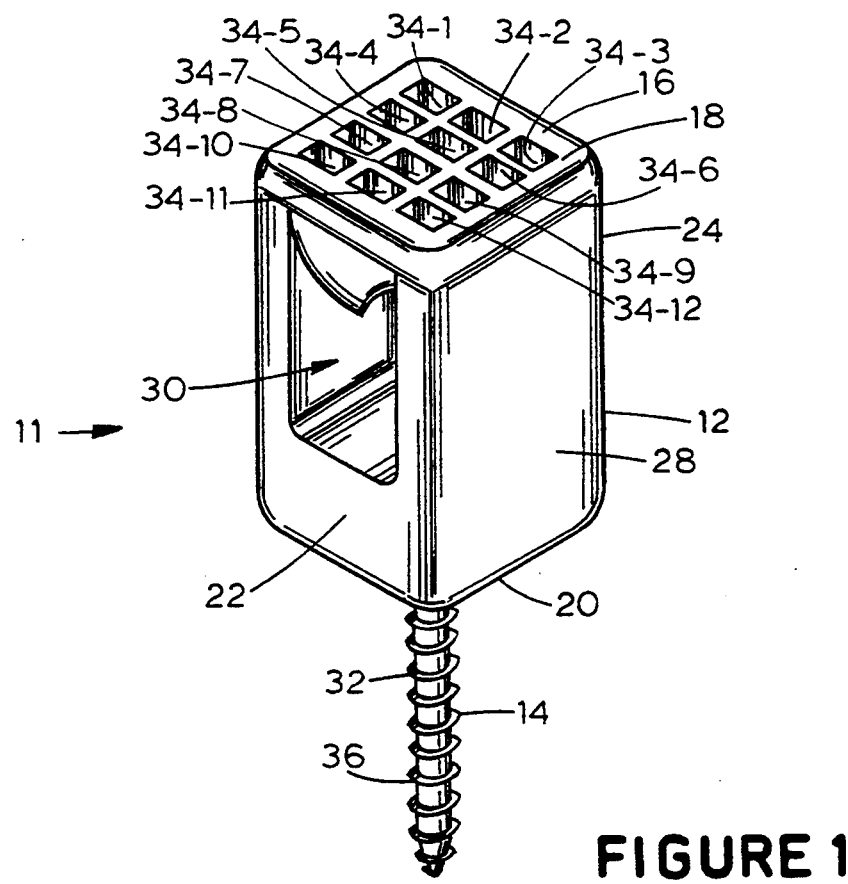
FIG. 1 is a perspective view of one embodiment of a wireholder according to the present invention.
Figure 2:
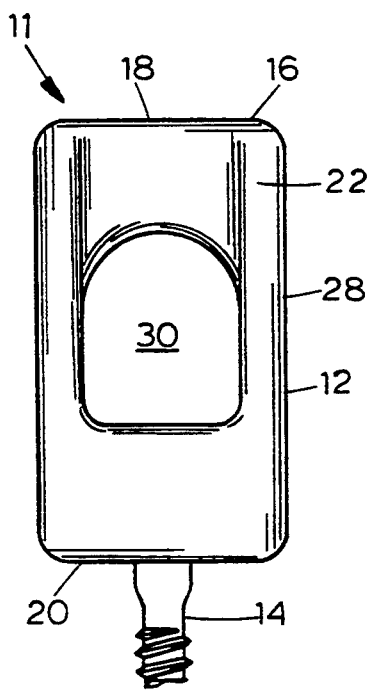
FIG. 2 is a side view of the wireholder shown in FIG. 1.

As shown in FIGS. 1-4, a wireholder 11 includes a main body portion 12, an attaching portion 14, and a tool receiving portion 16. The main body portion 12 has a top 18, a bottom 20, a front 22, a back 24, and sides 26 and 28. An opening 30 extends entirely through the main body portion 12 from the front 22 to the back 24. This opening 30 can receive a wire which is to be secured to a structure such as a wall of a building, a pipe, a pole, a post, or the like.

The attaching portion 14 of the wireholder 11 may be, for example, a wood screw 32 having a bolt end 34 (see FIG. 4). The bolt end 34 is molded into the bottom 20 of the main body portion 12. The attaching portion 14 also has a threaded end 36 for threading into wood such as the side of a building. Although the bottom 20 of the wireholder 11 is shown molded around the bolt end 34 of the wood screw 32, it should be apparent that the wood screw 32 can be affixed to the main body portion 12 by any other suitable means. For example, the wood screw 32 may be threaded into the main body portion 12 though its bottom 20.

Figure 3:
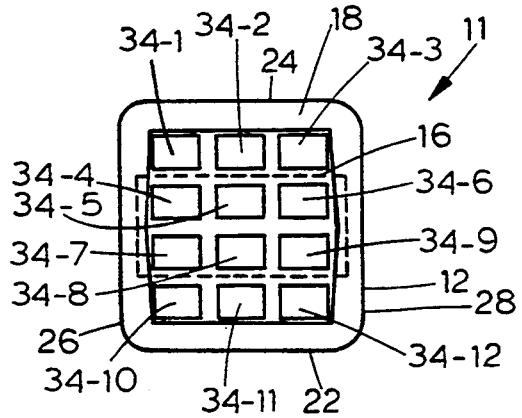
FIG. 3 is a top view of the wireholder shown in FIG. 1.
Figure 7:
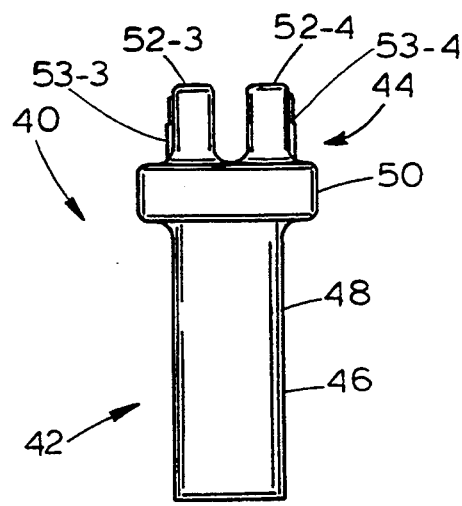
FIG. 7 is a side view of the installing tool shown in FIG. 5.
Figure 8:
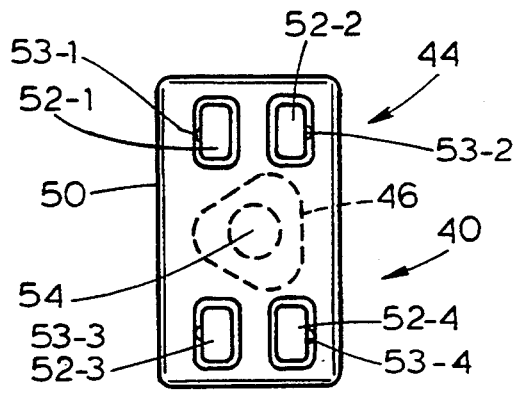
FIG. 8 is an end view of a first end of the installing tool shown in FIG. 5.
Figure 9:
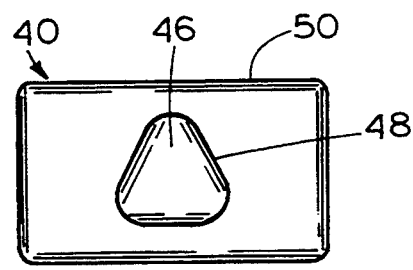
FIG. 9 is an end view of a second end of the installing tool shown in FIG. 5.
Figure 10:
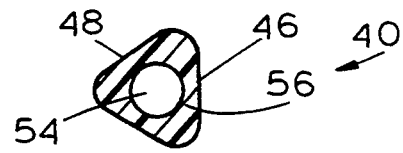
FIG. 10 is a cross-sectional view taken along the section lines 10—10 shown in FIG. 6.

The tool receiving portion 16 comprises a plurality of recesses 34-1 through 34-12 which are formed in the main body portion 12 through its top 18. At least some of the recesses 34-1 through 34-12 are arranged to receive tabs or projections of an installing tool 40 shown in FIGS. 5-10. Although twelve recesses in the main body portion 12 are shown in FIGS. 1 and 3, it should be apparent that the main body portion 12 can be provided with any other suitable number of recesses such as a number of recesses equal to the number of tabs provided on the installing tool 40.

The main body portion 12 is preferably comprised of an electrically insulating material. For example, the main body portion 12 of the wireholder 11 may be comprised of a nylon alloy, such as an alloy of nylon and glass fiber. A suitable nylon alloy is Verton ® supplied by LNP Engineering Plastics. Verton ® is a family of long-fiber-reinforced thermoplastics. However, any other electrically insulating material, such as a strong and durable plastic, is suitable for the main body portion 12 of the wireholder 11, as long as the material resists chipping and/or breakage due to shipment and is strong enough to withstand expected amounts of torque being applied to it by a power tool during installation of the wireholder 11. In addition, the wireholder 11 may be further protected during its installation by the installing tool 40, as will be explained hereinafter.

The installing tool 40, which is suitable for installing the wireholder 11, is shown in FIGS. 5-10. The installing tool 40 has a first end 42 and a second end 44. The first end 42 is in the form of a stem 46. The stem 46 has an outer perimeter 48 which may be preferably triangular in shape and which may be arranged to accommodate the chuck of a power drill. The triangular shape of the stem 46 insures that the torque produced by the power drill will be transferred through its chuck to the stem 46 and so that the stem 46 will not slip in the chuck of the power drill. Although the shape of the stem 46 is shown as triangular, the stem 46 may have any other suitable shape.

The second end 44 of the installing tool 40 includes a base 50, which is connected to the stem 46, and a plurality of tabs 52-1 through 52-4, which project from the base 50. The tabs 52-1 through 52-4 may be provided with corresponding ribs 53-1 through 53-4. Although there are preferably four tabs projecting from the base 50 of the installing tool 40, it should be apparent that any other suitable number of tabs can be provided. Also, although the installing tool 40 can be manufactured in any of a variety of ways, the installing tool 40 preferably is a one piece molded device. The installing tool 40 conveniently may be molded from the same material as is used for the main body portion 12 of the wireholder 11.

The installing tool 40 further may be provided with a hollow 54 extending through the base 50 and into the stem 46. Thus, a wall 56 is formed in the stem 46 between the outer perimeter 48 of the stem 46 and the hollow 54. By controlling the size of the hollow 54, the thickness of the wall 56 may be arranged such that, if a power drill applies torque through the installing tool 40 to the wireholder 11 during installation of the wireholder 11, and if the applied torque is above a desired torque limit, the stem 46 will break in order to remove the torque being applied by the power drill from the wireholder 11. This desired torque limit may be selected to be below the point at which damage to the wireholder 11 may otherwise occur. Accordingly, the wireholder 11 is protected by the installing tool 40 from the application of damaging amounts of installing torque.

The tabs 52-1 through 52-4 of the installing tool 40, and the recesses 34-1 through 34-12 of the wireholder 11, are arranged to accommodate one another. Accordingly, with the configuration shown in the drawings, when the installing tool 40 is releasably attached to the wireholder 11, the tab 52-1 is seated into the recess 34-4, the tab 52-3 is seated into the recess 34-6, the tab 52-2 is seated into the recess 34-7, and the tab 52-4 is seated into the recess 34-9. The ribs 53-1 through 53-4 ensure a snug fit between the tabs 52-1 through 52-4 of the installing tool 40 and the corresponding recesses of the wireholder 11 so that, at the time of installing the wireholder 11, the installer need not directly hold the wireholder 11 onto the installing tool 40.

Figure 11:
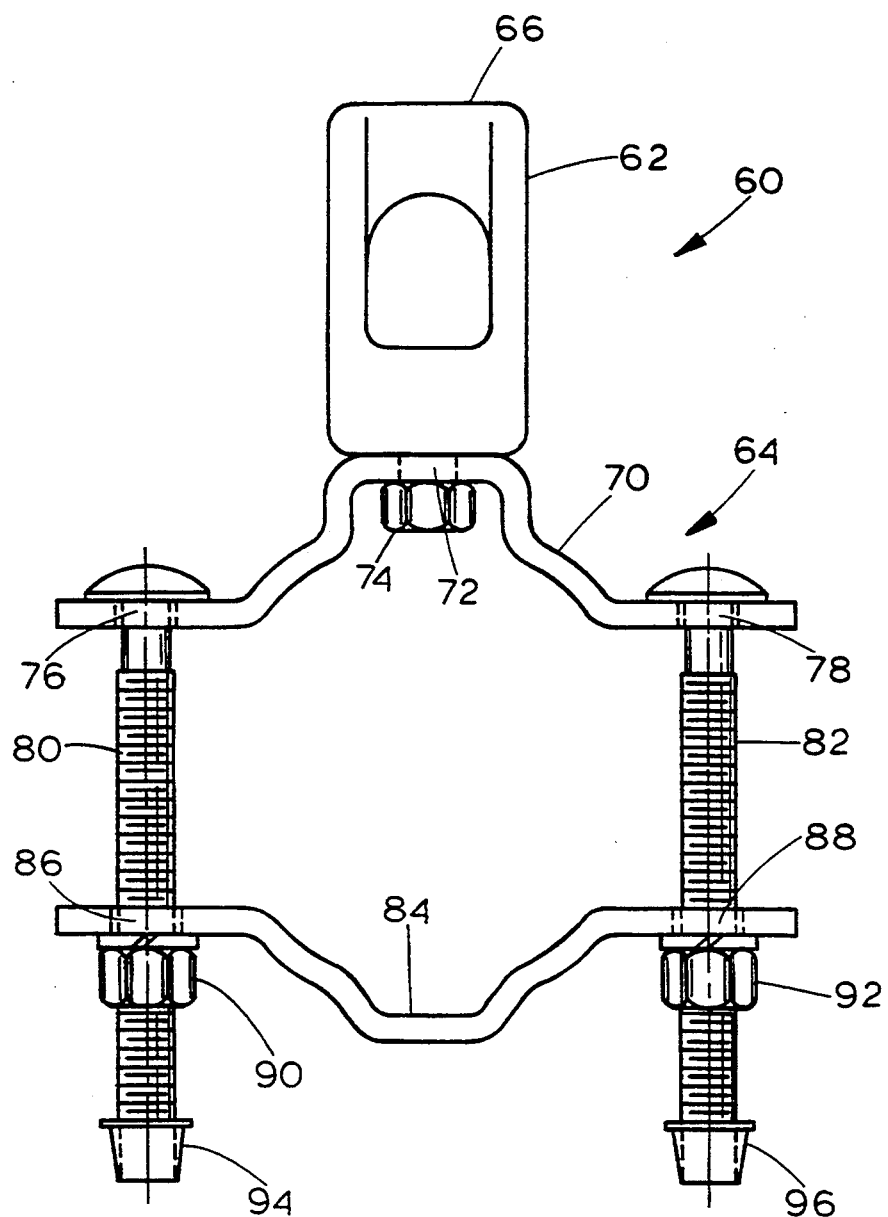
FIG. 11 illustrates another embodiment of a wireholder according to the present invention.

An alternative attaching portion for a wireholder according to the present invention may be provided in order to secure the wireholder to structures other than the wood side of a building. For example, a wireholder 60 is shown in FIG. 11 and is arranged for attachment to a pipe. The wireholder 60 has a main body portion 62 which may be similar to the main body portion 12 of the wireholder 11 and which may be similarly formed of a nylon alloy or other plastic material having sufficient strength to resist chipping or breakage during shipment. The wireholder 60 also has an attaching portion 64 and a tool receiving portion 66.

Figure 12:
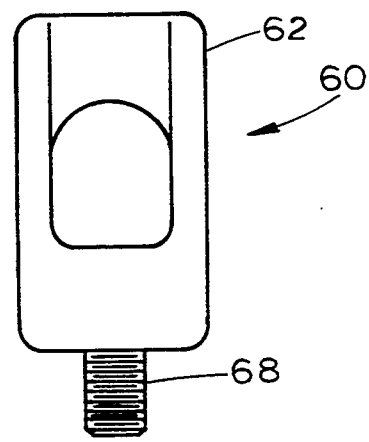
FIG. 12 illustrates a portion of the wireholder shown in FIG. 11.

The attaching portion 64 includes a carriage bolt 68 (see FIG. 12) which may be molded or threaded into the main body portion 62. A first bracket 70 has a hole 72 therein for receiving the carriage bolt 68 of the wireholder 60. After the carriage bolt 68 is inserted through the hole 72 of the first bracket 70, a hex nut 74 is threaded over the carriage bolt 68 to secure the first bracket 70 to the main body portion 62 of the wireholder 60.

The first bracket 70 also has holes 76 and 78 through which are inserted corresponding carriage bolts 80 and 82. A second bracket 84 also has a pair of holes 86 and 88 for receiving the corresponding carriage bolts 80 and 82. When the wireholder 60 is to be attached to a pipe, the pipe may be clamped between the first bracket 70 and the second bracket 84 by inserting the carriage bolts 80 and 82 through the corresponding holes 86 and 88 of the second bracket 84 and by then threading a pair of hex nuts 90 and 92 over the corresponding carriage bolts 80 and 82 to clamp a pipe between the first bracket 70 and the second bracket 84. If desired, a pair of plastic caps 94 and 96 may be inserted over corresponding ends of the carriage bolts 80 and 82.

The tool receiving portion 66 of the wireholder 60 may include a plurality of recesses (not shown) similar to the recesses 34-1 through 34-12 of the wireholder 11.

Figure 13A:
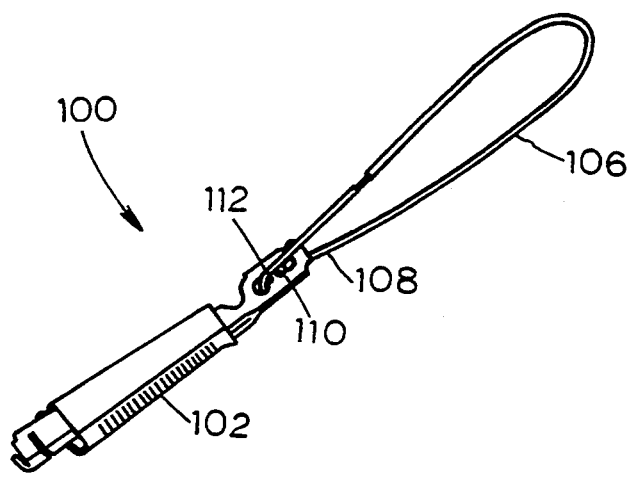
FIGS. 13A and 13B are perspective views of a wedge clamp device which can be used in conjunction with the wireholder of the present invention.
Figure 13B:
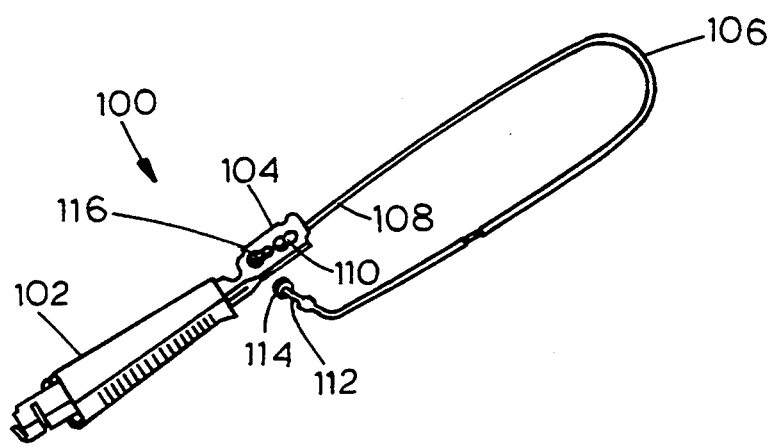

In one application of the wireholder of the present invention, a wedge clamp, such as a wedge clamp 100, may be provided. The wedge clamp 100, which is shown in FIGS. 13A and 13B, has a wedge receiving body 102, a wire connector 104, and a wire loop 106. The wire loop 106 has a first end 108 suitably attached to the wire connector 104 through a hole 110 therein. An end 112 of the wire loop 106 may be provided with a flat tip 114 to be inserted through a key hole 116 in the wire connector 104 so that the end 112 of the wire loop 106 may be releasably secured to the wire connector 104 of the wedge clamp 100.

Figure 14:
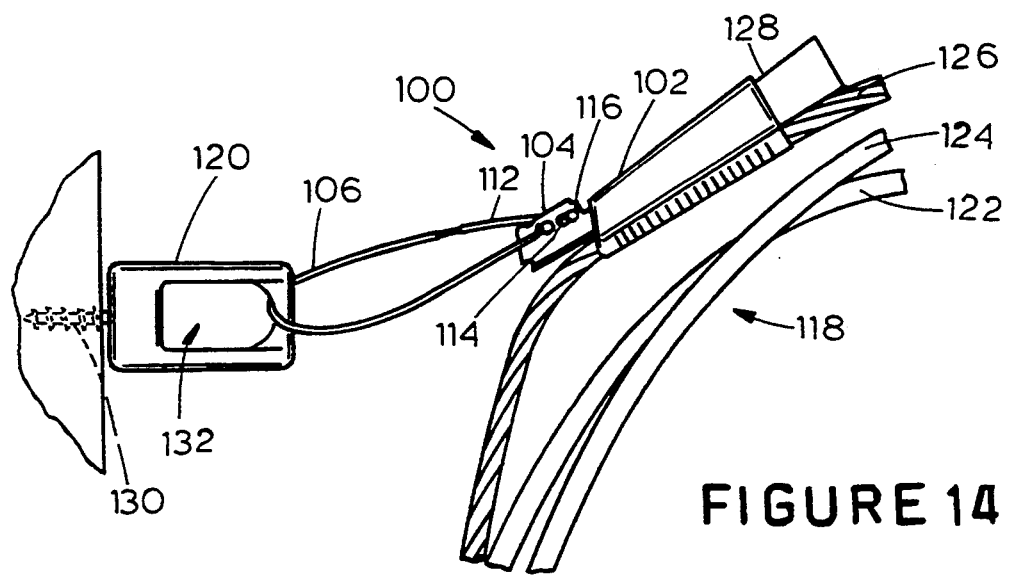
FIG. 14 illustrates the use of a wireholder according to the present invention in combination with a wedge clamp for anchoring electrical conductors to a structure.

The wedge clamp 100 may be used to fasten an electrical service 118 to a wireholder 120 as shown in FIG. 14. The wireholder 120 may have the same configuration as the wireholder 11 shown in FIGS. 1-4. The electrical service 118 may include, for example, a pair of insulated conductors 122 and 124 and a ground line 126. Typically, at the time that the electrical service 118 is dropped from an overhead electrical utility pole to an electrical meter of a building, the insulated conductors 122 and 124 are wound around the ground line 126. The ground line 126 is then inserted through the wedge receiving body 102 of the wedge clamp 100. A wedge 128 is wedged into the wedge receiving body 102 of the wedge clamp 100 in order to clamp the ground line 126 to the wedge receiving body 102 of the wedge clamp 100.

The wireholder 120 is then attached to a structure, for example, by the use of the installing tool 40 shown in FIGS. 5-10. Accordingly, the stem 46 of the installing tool 40 is inserted into the chuck of a power drill. The tabs 52-1 through 52-4 are inserted into corresponding recesses of the wireholder 120. The power drill is energized to apply torque to the wireholder 120 through the installing tool 40 thereby threading a wood screw 130 of the wireholder 120 into the structure to which the wireholder 120 is to be attached. If the torque applied to the wireholder 120 by the power drill exceeds a desired torque limit, the stem 46 of the installing tool 40 breaks in order to remove the torque from the wireholder 120 thereby protecting it against damage due to excessive torques.

The end 112 of the wire loop 106 is then inserted through a hole 132 of the wireholder 120 and is secured back to the key hole 116 of the wire connector 104 of the wedge clamp 100. Thus, the wireholder 120 secures the wire loop 106 of the wedge clamp 100 and thereby anchors the electrical service 118 to a structure. The electrical service 118 can then be connected to an electrical meter.

It should be apparent that the wireholder according to the present invention can secure wires and lines other than the wire loop 106 of the wedge clamp 100. For example, the wireholder according to the present invention can be used to anchor guy wires to a structure. Also, instead of providing a wireholder with an attaching portion in the form of the wood screw 32 shown in FIGS. 1-4 or the carriage bolt 68 shown in FIG. 12, a wireholder according to the present invention alternatively can be provided with a standoff such as an elongated fiber glass rod. Such a standoff, for example, may be threaded so that its associated wireholder can be attached to a structure.

Figure 15:
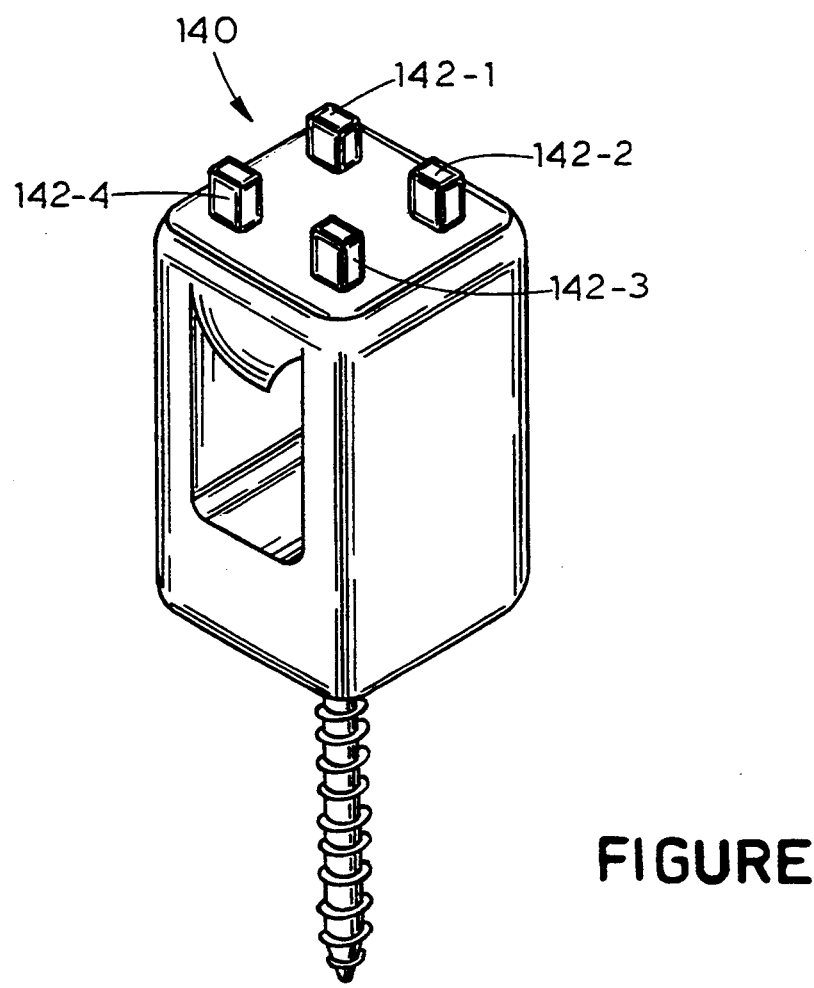
FIG. 15 illustrates yet another embodiment of a wireholder according to the present invention; and, FIG. 16 illustrates another embodiment of an installing tool according to the present invention.
Figure 16:
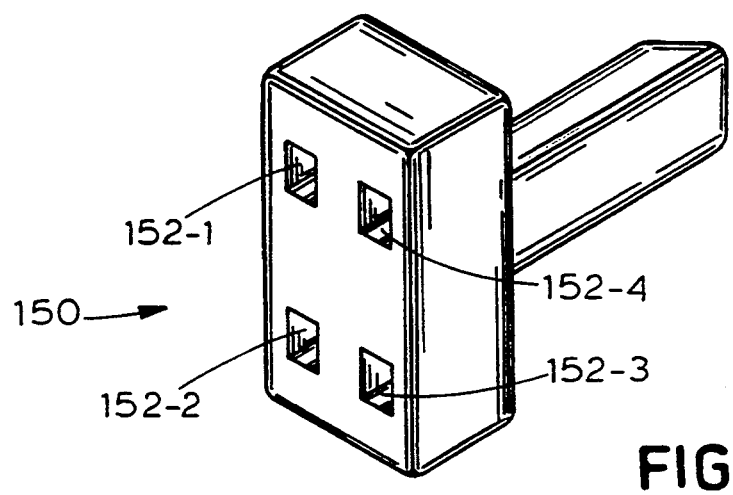

Furthermore, instead of providing tabs on the installing tool and recesses in the wireholder as described above, the tabs may be provided on a wireholder and the recesses may be provided in an installing tool as shown in FIGS. 15 and 16. Thus, as shown in FIG. 15, a wireholder 140, having a construction similar to the wireholders 11, 60, and 120, has a plurality of tabs 142-1 through 142-4. These tabs are arranged to receive the corresponding recesses of an installing tool such as an installing tool 150 shown in FIG. 16. As shown in FIG. 16, the installing tool 150 has recesses 152-1 through 152-4 corresponding to the tabs 142-1 through 142-4 of the wireholder 140 of FIG. 15.

Moreover, the tabs and recesses of the installing tool and the wireholder, or of the wireholder and the installing tool as appropriate, may have any suitable shape such as a three, four, five, six, or more sided polygon, or such as used in slot or Phillips headed screws and screw drivers.

Additional modifications of the present invention, other than those which have been specifically describe herein, also will be apparent to those skilled in the art. Accordingly, the present invention is to be limited only by the claims attached hereto.

I claim:

1. A wireholder comprising:
   an insulator having first and second ends and having an opening therethrough for receiving a wire to be secured to a structure;
   attaching means for attaching the insulator to the structure; and,
   tool receiving and torque transferring means associated with the insulator for receiving an installing tool and for transferring torque through the insulator to the attaching means so that the installing tool can attach the insulator to the structure by way of the attaching means, wherein the tool receiving and torque transferring means includes at least one recess in the first end of the insulator, the recess being arranged to receive a tab of the installing tool.

2. The wireholder of claim 1 wherein the attaching means is affixed to the second end of the insulator.

3. The wireholder of claim 1 wherein the first end of the insulator has a first number of recesses therein, at least some of the first number of recesses being arranged to receive a second number of tabs of the installing tool.

4. The wireholder of claim 3 wherein the second end of the insulator is affixed to the attaching means.

5. The wireholder of claim 4 wherein the attaching means is a threaded shaft.

6. The wireholder of claim 5 wherein the insulator has first, second, third, and fourth sides between the first and second ends, wherein the first and third sides are opposing sides, wherein the second and fourth sides are opposing sides, and wherein the opening extends from the first side to the third side, the opening being arranged to receive the wire.

7. The wireholder of claim 6 wherein the insulator is a nylon alloy.

8. The wireholder of claim 7 wherein the first and second numbers are unequal.

9. A wireholder comprising:
an insulator having first and second ends and having an opening therethrough for receiving a wire to be secured to a structure;
attaching means for attaching the insulator to the structure; and,
tool receiving and torque transferring means associated with the insulator for receiving an installing tool and for transferring torque through the insulator to the attaching means so that the installing tool can attach the insulator to the structure by way of the attaching means, wherein the first end of the insulator has at least one tab, the tab extending beyond the insulator and being arranged to receive a recess of the installing tool.

10. The wireholder of claim 9 wherein the second end of the insulator is affixed to the attaching means.

11. A wireholder comprising:
a main body portion being arranged to receive and to hold a wire to be secured to a structure, the main body portion having opposing first and second ends;
an attaching portion affixed to the first end of the main body portion, the attaching portion having a configuration for facilitating the attachment of the main body portion to the structure; and,
the main body portion having a strength, and the second end of the main body portion being configured to receive an installing tool, so that torque can be transferred from a power tool to the attaching portion through the installing tool and the main body portion, the second end of the main body portion having a recess, the recess being arranged to receive a projection of the installing tool.

12. The wireholder of claim 11 wherein the second end has a first number of recesses, at least some of the first number of recesses being arranged to receive a second number of projections of the installing tool.

13. The wireholder of claim 12 wherein the attaching portion is a threaded shaft.

14. The wireholder of claim 13 wherein the main body portion has first, second, third, and fourth sides between the first and second ends, wherein the first and third sides are opposing sides, wherein the second and fourth sides are opposing sides, and wherein the main body portion has an opening extending therethrough from the first side to the third side, the opening being arranged to receive the wire.

15. The wireholder of claim 14 wherein the main body portion is comprised of a nylon alloy.

16. The wireholder of claim 15 wherein the first and second numbers are unequal.

17. A wireholder comprising:
a main body portion being arranged to receive and to hold a wire to be secured to a structure, the main body portion having opposed first and second ends;
an attaching portion affixed to the first end of the main body portion, the attaching portion having a configuration for facilitating the attachment of the main body portion to the structure; and,
the main body portion having a strength, and the second end of the main body portion being configured to receive an installing tool, so that torque can be transferred from a power tool to the attaching portion through the installing tool and the main body portion, the second end of the main body portion being configured with at least one projection, the projection being arranged to receive a recess of the installing tool.

18. An installing tool for use in installing a wireholder, the installing tool comprising:
a first end being arranged to releasably engage the wireholder; and,
a second end being arranged to releasably engage a power tool so that, when the first end engages the wireholder and the second end engages the power tool, torque may be transferred from the power tool to the wireholder by way of the first end, the second end being further arranged to automatically disengage the wireholder from the power tool if the torque applied by the power tool to the wireholder exceeds a desired torque limit.

19. The installing tool of claim 18 wherein the second end comprises a hollow stem having a wall thickness such that the hollow stem breaks in order to disengage the wireholder from the installing tool if the torque applied by the power tool to the wireholder exceeds a desired torque limit.

20. The installing tool of claim 19 wherein the first end comprises a base and at least one tab, wherein the base is connected to the hollow stem, and wherein the tab is arranged to be inserted into a recess of the wireholder so that the tab releasably engages the wireholder.

21. The installing tool of claim 19 wherein the first end comprises a base and a plurality of tabs, wherein the base is connected to the hollow stem, and wherein the tabs are arranged to be inserted into corresponding recesses of the wireholder so that the tabs releasably engage the wireholder.

22. The installing tool of claim 19 wherein the first end comprises a rectangular base having four corners and four tabs, wherein each tab is located at a corresponding corner of the rectangular base, wherein the rectangular base is connected to the hollow stem, and wherein the tabs are arranged to be inserted into corresponding recesses of the wireholder so that the tabs releasably engage the wireholder.

23. The installing tool of claim 22 wherein the hollow stem is generally triangular.

24. The installing tool of claim 23 wherein the first and second ends are comprised of a one-piece molded nylon alloy.

25. The installing tool of claim 18 wherein the second end is arranged to releasably attach the first end to a chuck of a power drill so that, when the first end engages the wireholder, torque may be transferred from the power drill to the wireholder by way of the first end, and wherein the second end is further arranged to automatically disengage the wireholder from the chuck of the power drill if the torque applied by the power drill to the wireholder exceeds a desired torque limit.

26. The installing tool of claim 25 wherein the second end comprises a hollow stem having a wall thickness such that the hollow stem breaks to disengage the wireholder from the power drill if the torque applied by the power drill to the wireholder exceeds the desired torque limit.

27. The installing tool of claim 26 wherein the first end comprises a base and a plurality of tabs, wherein the base is connected to the hollow stem, and wherein the tabs are arranged to be inserted into corresponding recesses of the wireholder so that the tabs releasably engage the wireholder.

28. The installing tool of claim 27 wherein the hollow stem is generally triangular.

29. The installing tool of claim 25 wherein the first end comprises at least one recess to receive a tab of a wireholder.

30. The installing tool of claim 29 wherein the second end comprises a generally triangular hollow stem.

31. A wireholding arrangement comprising:
an installing tool including
a stem being arranged to fit into a chuck of a power drill, and
a torque transferring device driven by the stem; and,
a wireholder including
a main body portion having an opening therethrough to receive a wire to be anchored to a structure and further having means for releasably receiving the torque transferring device of the installing tool, wherein one of the torque transferring device and the means comprises a tab and the other of the torque transferring device and the means comprises a recess,
an attaching portion affixed to the main body portion, the attaching portion having a configuration for facilitating the attachment of the main body portion to the structure, and
the main body portion having a strength to permit torque from the power drill to be transferred from the power drill to the attaching portion through the installing tool, the means, and the main body portion.

32. The wire holding arrangement of claim 31 wherein the stem is arranged to disengage the wireholder from the chuck of the power drill if the torque applied by the power drill to the wireholder exceeds a desired torque limit of the wireholder.

33. The wire holding arrangement of claim 32 wherein the stem is hollow and has a wall thickness such that the hollow stem breaks to disengage the wireholder from the power drill if the torque applied by the power drill to the wireholder exceeds a desired torque limit of the wireholder.

34. The wireholding arrangement of claim 32 wherein the torque transferring device comprises a base and a plurality of tabs, wherein the base is connected to the stem, and wherein the tabs are arranged to be inserted into corresponding recesses of the main body portion of the wireholder so that the tabs releasably engage the wireholder.

35. The wire holding arrangement of claim 34 wherein the main body portion comprises first and second ends and wherein the recesses of the main body portion are in the first end.

36. The wire holding arrangement of claim 35 wherein the second end of the main body portion is affixed to the attaching portion.

37. The wire holding arrangement of claim 36 wherein the attaching portion is a threaded shaft.

38. The wire holding arrangement of claim 37 wherein the main body portion has first, second, third, and fourth sides between the first and second ends, wherein the first and third sides are opposing sides, wherein the second an fourth sides are opposing sides, and wherein the main body portion has the opening extending therethrough between the first and third sides, the opening being arranged to receive the wire.

39. The wire holding arrangement of claim 38 wherein the stem is hollow and has a wall thickness such that the hollow stem breaks to disengage the wireholder from the power drill if the torque applied by the power drill to the wireholder exceeds a desired torque limit of the wireholder.

40. The wire holding arrangement of claim 39 wherein the main body portion of the wireholder and the installing tool each comprise a molded nylon alloy.

41. The wire holding arrangement of claim 40 wherein the hollow stem is generally triangular.

42. A method of installing a wireholder comprising the following steps:
attaching a stem of an installing tool to a power tool;
attaching the installing tool to a wireholder; and,
energizing the power tool to transfer torque from the power tool to the wireholder through the installing tool in order to attach the wireholder to a structure.

43. The method of claim 42 wherein the step of attaching a stem of an installing tool to a power tool comprises the step of attaching a breakable stem of the installing tool to a power tool so that the stem breaks to disengage the wireholder from the power tool if the torque applied by the power tool to the wireholder exceeds a predetermined theoretical torque limit of the wireholder.

44. The method of claim 42 wherein the step of attaching a stem of an installing tool to a power tool comprises the step of attaching a hollow stem of the installing tool to a power tool, the hollow stem having a wall thickness so that the hollow stem breaks to disengage the wireholder from the power tool if the torque applied by the power tool to the wireholder exceeds a predetermined theoretical torque limit of the wireholder.

45. The method of claim 44 wherein the step of attaching the installing tool to a wireholder comprises the step of inserting projections of the installing tool into recesses in the wireholder.

46. The method of claim 44 wherein the step of attaching the installing tool to a wireholder comprises the step of inserting projections of the wireholder into recesses in the installing tool.

* * * * *